(12) United States Patent
Kasuya et al.

(10) Patent No.: US 8,623,571 B2
(45) Date of Patent: Jan. 7, 2014

(54) FUEL CELL SYSTEM

(75) Inventors: Kuri Kasuya, Saitama (JP); Takuya Wakabayashi, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 901 days.

(21) Appl. No.: 12/698,446

(22) Filed: Feb. 2, 2010

(65) Prior Publication Data

US 2010/0196772 A1   Aug. 5, 2010

(30) Foreign Application Priority Data

Feb. 3, 2009   (JP) ................. 2009-022291

(51) Int. Cl.
*H01M 8/04*   (2006.01)

(52) U.S. Cl.
USPC ....................................... 429/512

(58) Field of Classification Search
None
See application file for complete search history.

(56) References Cited

FOREIGN PATENT DOCUMENTS

| JP | 2002-054409 A | 2/2002 |
|---|---|---|
| JP | 2006-221836 A | 8/2006 |
| JP | 2008-226513 A | 9/2008 |

OTHER PUBLICATIONS

Japanese Office Action dated May 10, 2011, issued in corresponding Japanese Patent Application No. 2009-022291.

*Primary Examiner* — Maria J Laios
(74) *Attorney, Agent, or Firm* — Westerman, Hattori, Daniels & Adrian, LLP

(57) ABSTRACT

The present invention discloses a fuel cell system that blocks the oxidant gas flow passage. This fuel cell system includes a fuel cell stack, the oxidant gas supply passage, the oxidant gas exhaust passage, the first valve and second valve of normally open type, the first motor that operates open and close operations of the first valve, the second motor that operates open and close operations of the second valve, and the ECU that controls the first motor and the second motor. This ECU controls the first valve and the second valve to be in the open state during the power generation in the fuel cell stack, thereby to open the cathode flow passage, and controls the first valve and the second valve to be in the close state after the power generation in the fuel cell stack is stopped, thereby to block the cathode flow passage. The fuel cell system of the present invention further includes the first solenoid device and the second solenoid device that lock the respective valve bodies of the first valve and the second valve so as to maintain the close state of the first valve and the second valve.

1 Claim, 4 Drawing Sheets

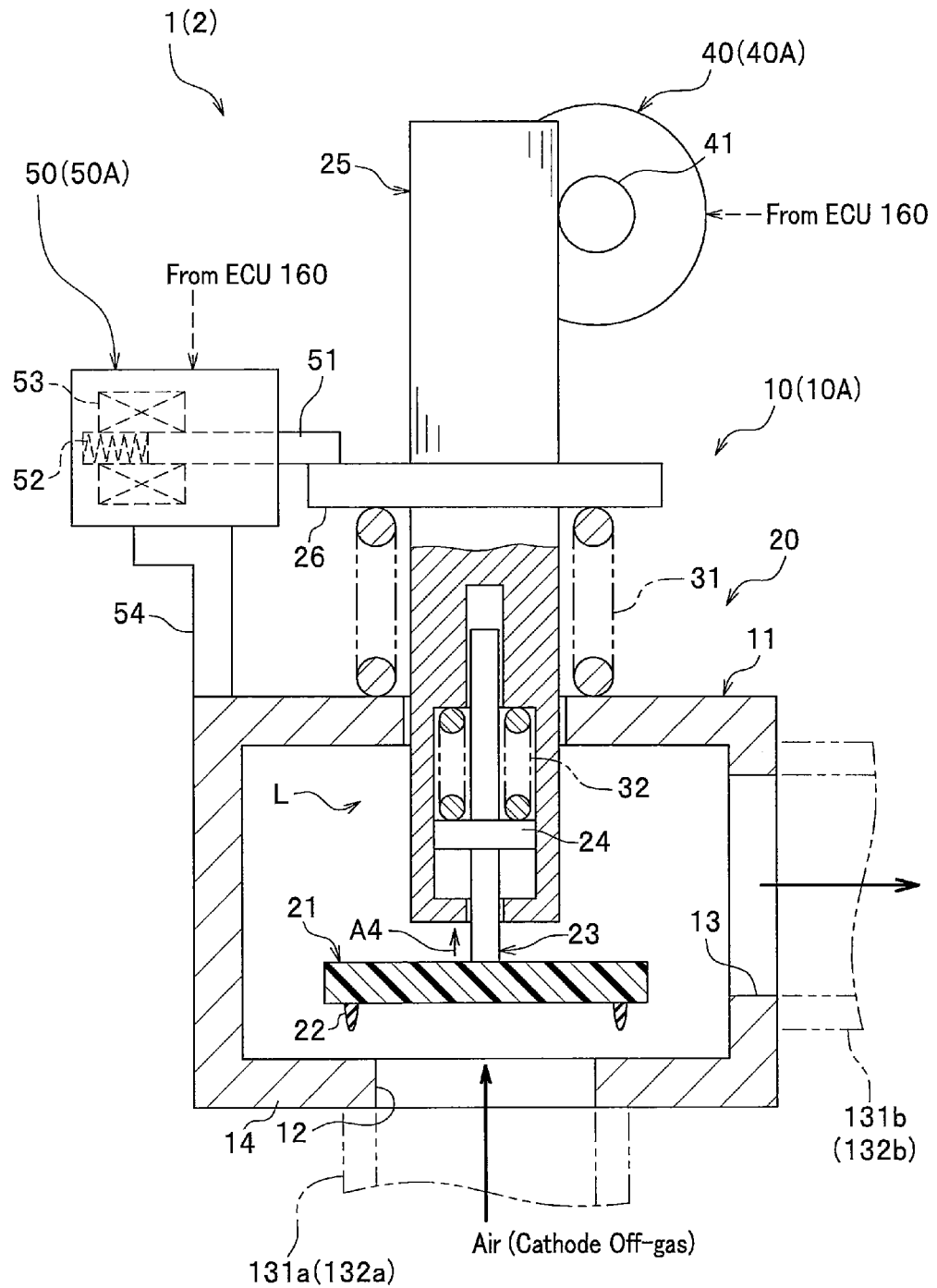

FUEL CELL SYSTEM

CROSS-REFERENCE TO RELATED APPLICATION

This application claims the foreign priority benefit under 35 U.S.C. §119 of Japanese Patent Application No. 2009-022291 filed on Feb. 3, 2009, the disclosure of which is incorporated herein by reference.

BACKGROUND OF THE INVENTION

1. Field of the Invention

The present invention relates to a fuel cell system.

2. Description of the Related Art

Recently, there have been rapidly progressed various developments of fuel cells that generate power by supply with hydrogen (fuel gas) and oxygen (oxidant gas); for example, fuel cells are increasingly applied to a fuel cell vehicle as its power source. Such fuel cells include an anode flow passage (fuel gas flow passage) and a cathode flow passage (oxidant gas flow passage) therein.

However, while power generation in fuel cells is stopped, that is, in a state in which fuel cells are electrically disconnected to an external load, when air externally flows into the cathode flow passage and this air (oxygen) is consumed by an electrode reaction under a cathode catalyst (such as Pt, Ru), so that potential of the cathode may increase, or residual moisture may be discomposed, consequently generating high-activated OH radical, etc. Such an increase of the cathode potential or generation of OH radical, etc. may cause oxidation of carbon (C) of carbon paper constituting the cathode and the catalyst, or decomposition of electrolyte membrane, resulting in deterioration of the fuel cells.

Some of the air flown in the cathode flow passage passes through the electrolyte membrane so that there cross-leak of the air to the anode occurs, and if this cross-leaked air is consumed under the anode catalyst, potential of the anode may increase or OH radical, etc., may be generated, so that carbon (C) of carbon paper constituting the cathode and the catalyst may be oxidized, or decomposition of electrolyte membrane may be caused, resulting in deterioration of the fuel cells.

To address such a problem, there has been proposed a fuel cell system in which normally closed type electromagnetic valves, each of which incorporates a solenoid, are provided in upper and lower reaches of the cathode, respectively; while power generation in the fuel cells is stopped, the electromagnetic valves are closed to block the cathode flow passage so as to prevent a fresh air flow externally flowing into the cathode flow passage, thereby to reduce cross leak amount of the air from the cathode to the anode (see JP 2006-221836 A).

However, the fuel cell system, as disclosed in JP 2006-221836 A, includes the normally closed type electromagnetic valves at the upper and lower reaches of the cathode flow passage, and while the air is being flown through the cathode flow passage in order to generate power in the fuel cells, current is needed to be continuously supplied for the solenoids of the electromagnetic valves to maintain the electromagnetic valves in the open state. Specifically, while maintaining the electromagnetic valve in the open state, power generated by the fuel cells and power stored in a battery are being consumed at the solenoids, resulting in inefficiency of power generation.

The present invention has an object to provide a fuel cell system that blocks an oxidant gas flow passage, as well as reducing consumption of energy such as electric power.

SUMMARY OF THE INVENTION

The present invention provides a fuel cell system including fuel cells including a fuel gas flow passage and an oxidant gas flow passage, and generating power with fuel gas supply for the fuel gas flow passage and oxidant gas supply for the oxidant gas flow passage, respectively; an oxidant gas supply passage in which oxidant gas flows toward the oxidant gas flow passage; an oxidant gas exhaust passage in which oxidant gas discharged from the oxidant gas flow passage flows; a first valve of normally open type provided in the oxidant gas supply passage; a second valve of normally open type provided in the oxidant gas exhaust passage; a first operating member for operating open and close of the first valve; a second operating member for operating open and close of the second valve; and a controller for controlling the first operating member and the second operating member. In this fuel cell system, during power generation in the fuel cells, the controller controls the first operating member to operate the first valve to be in an open state, and controlling the second operating member to operate the second valve to be in an open state, thereby to open the oxidant gas flow passage, after the power generation in the fuel cells is stopped, the controller controls the first operating member to operate the first valve to be in a close state, and the controller controlling the second operating member to operate the second valve to be in a close state, thereby to close the oxidant gas flow passage. The fuel cell system further includes a close state maintaining member for locking at least one of valve bodies of the first valve and the second valve, thereby to maintain the close stat of at least one of the first valve and the second valve whose valve body is locked after the power generation in the fuel cells is stopped and after the first valve and the second valve are closed.

According to this fuel cell system, since the first valve and the second valve are of normally open type, the first valve and the second valve can be set to be in the open state with consuming no energy such as electric power when oxidant gas is supplied in the oxidant gas flow passage to generate power in the fuel cells.

On the other hand, in order to block the oxidant gas flow passage in the fuel cells to prevent a new oxidant gas flow into the oxidant gas flow passage after the power generation in the fuel cells is stopped and while the system is out of operation, the first and second valves are set to be in the close state by the first and second operating members, and then the close state maintaining member locks at least one of valve bodies of the first valve and the second valve so that the close state of at least one of the first valve and the second valve whose valve body is locked can be maintained. This means that the close state of at least one of the first valve and the second valve can be maintained with consuming no energy such as electric power.

The first and second valves may preferably be provided with this close state maintaining member respectively, as described later in the embodiment. Blocking the oxidant gas flow passage may also be referred to as a "cathode block".

In the above fuel cell system, the close state maintaining member includes a first close state maintaining member for maintaining the close state of the first valve and a second close state maintaining member for maintaining the close state of the second valve, the first operating member includes a first electric drive device for driving the first valve from the open state into the close state with current supply, the second operating member includes a second electric drive device for driving the second valve from the open state into the close state with current supply, and after the first valve and the second valve are maintained in the close state by the first close state maintaining member and the second close state maintaining member, the current supply for the first electric drive device and for the second electric drive device is stopped.

According to this fuel cell system, the first electric drive device drives the first valve to be from the open state into the close state, and the second electric drive device drives the second valve to be from the open state into the close state. Specifically, since the first operating member and the second operating member are of electric driving type, a regulator, a flow rate control valve, a switching valve, etc. can be eliminated, which is different from those of pneumatic driving type or of hydraulic driving type, so that the entire system can be simplified and down-sized.

The first close state maintaining member can maintain the close state of the first valve and the second close state maintaining member can maintain the close state of the second valve.

After the close states are maintained by the first close state maintaining member and the second close state maintaining member, current supply for the first electric drive device and for the second electric drive device is stopped, so that power consumption in the first electric drive device and the second electric drive device can be stopped.

In the above fuel cell system, each of the first valve and the second valve comprises a lost motion mechanism for applying seal force in the close state thereof.

According to this fuel cell system, the lost motion mechanism can apply a seal force in the close states of the first valve and the second valve. Specifically, with this lost motion mechanism, tight contact between the valve seat and the valve body seated to this valve seat can be maintained while the first valve and the second valve are in the close state, so that the close states of the first valve and the second valve can be maintained.

In the above fuel cell system, the first valve and the second valve, each having the lost motion mechanism, are provided in such a manner that each valve body of the first valve and the second valve that is seated to a valve seat is pushed in a direction of the open state by pressure at an upper reach of the first valve and the second valve, and the first valve and the second valve comes in the open state if the pressure at the upper reach becomes equal to or greater than a predetermined pressure.

According to this fuel cell system, the first valve and the second valve having the lost motion mechanism respectively are provided in such a manner that the pressure at the upper reach of these valves is applied (urged) to these valves in their open direction, and the first valve and the second valve are set to be in the open state if the pressure at the upper reach thereof becomes equal to or greater than the predetermined pressure. This means that the first valve and the second valve function as relief valves to release the pressure at the upper reach thereof if the pressure at the upper reach becomes equal to or greater than the predetermined pressure.

Specifically, if the first valve provided in the oxidant gas supply passage is operated to be in the open state by the first operating member (first electric drive device) but actually the first valve still stays in the close state (in case of failure), the first valve is then set to be in the open state when the pressure at the upper reach of this valve becomes equal to or greater than the predetermined pressure. Accordingly, damages and or failures due to an abnormal rise in pressure can be prevented in the first valve, the pipes constituting the oxidant gas supply passage, various devices (such as an intercooler) provided on these pipes and the oxidant gas supply member (compressor in the embodiment described later).

In addition, if the second valve provided in the oxidant gas supply passage is operated to be in the open state by the second operating member (second electric drive device) but actually the second valve still stays in the close state (in case of failure), the second valve is then set to be in the open state when the pressure at the upper reach of this valve becomes equal to or greater than the predetermined pressure. Accordingly, damages and or failures due to an abnormal rise in pressure can be prevented in the second valve, the fuel cells and the pipes constituting the oxidant gas exhaust passage.

The second predetermined pressure that defines the second valve to be in the open state is preferably smaller than the first predetermined pressure that defines the first valve to be in the open state. In other words, the first predetermined pressure that defines the first valve to be in the open state may be different from the second predetermined pressure that defines the second valve to be in the open state.

Other features and advantages of the present invention will become more apparent from the following detailed description of the invention when taken in conjunction with the accompanying exemplary drawings.

BRIEF DESCRIPTION OF THE DRAWINGS

FIG. 4 is a sectional side view of a first valve device or second valve device of normally open type according the present embodiment, showing that the valve device is in the open state at the time of relief when a pressure at the upper reach becomes equal to or greater than a predetermined pressure.

DETAILED DESCRIPTION OF THE PREFERRED EMBODIMENT

Hereinafter, detailed descriptions are provided on an embodiment of the present invention with reference to FIG. 1 to FIG. 4.

<<Configuration of Fuel Cell System>>

Figure 1:
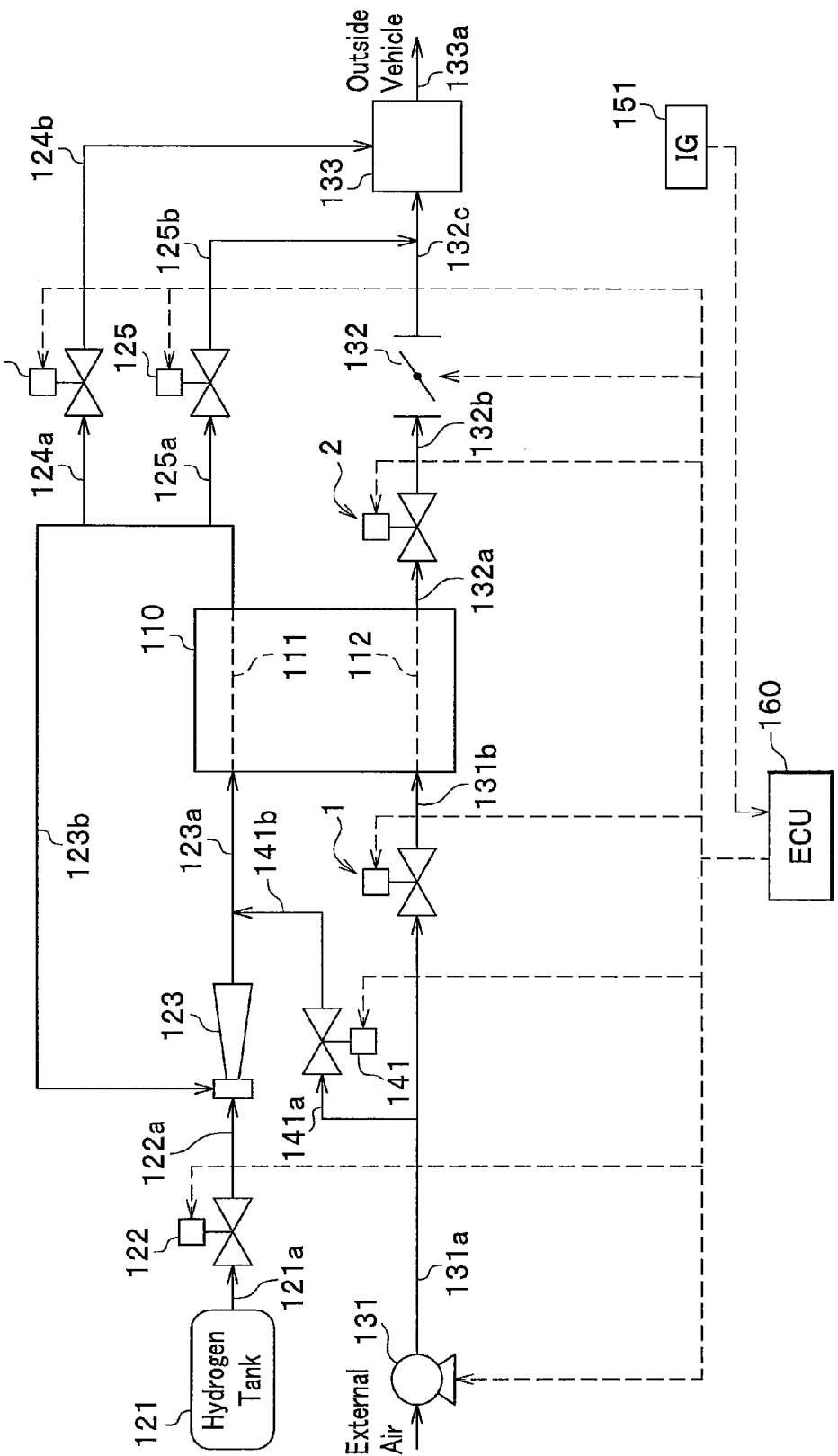
FIG. 1 shows a structure of a fuel cell system according to an embodiment of the present invention.

The fuel cell system 100 according to the embodiment of the present invention as shown in FIG. 1 is mounted in a not shown fuel cell vehicle (mobile body), for example. The fuel cell system 100 includes a fuel cell stack 110, an anode system that supplies and discharges hydrogen (fuel gas, reactive gas) for and from an anode of the fuel cell stack 110, a cathode system that supplies and discharges air containing oxygen (oxidant gas, reactive gas) for and from a cathode of the fuel cell stack 110, a scavenging gas introduction system that introduces scavenging gas into the anode system at the time of scavenging the fuel cell stack 110, and an ECU (Electronic Control Unit) 160 that electronically controls the above components.

<Fuel Cell Stuck>

The fuel cell stack 110 is a stack constituted by plural cells (200 to 400 cells, for example) formed in a layer stack, a single of which is a polymer electrolyte cell, and plural of these single cells are connected in series. A single cell includes an MEA (Membrane Electrode Assembly), and a pair of conductive separators that hold MEA therebetween. The MEA includes an electrolyte membrane (polymer electrolyte membrane) constituted by a univalent cationic exchange membrane, and an anode and a cathode (electrodes) that hold this electrolyte membrane therebetween.

Each anode and cathode respectively include porous solids having a carbon-paper-like conductive property or the like, and catalyst (such as Pt, Pu) supported by each own porous solid, causing an electrode reaction in the anode and the cathode.

Each separator includes grooves for supplying hydrogen or air to a whole surface of each MEA and through holes for supplying or discharging hydrogen or air to or from every single cell, and these grooves and through holes serve as the anode flow passage 111 (fuel gas flow passage) and the cathode flow passage 112 (oxidant gas flow passage).

When hydrogen is supplied for each anode via the anode flow passage 111, electrode reaction as represented by the formula (1) occurs, and when air is supplied for each cathode via the cathode flow passage 112, electrode reaction as represented by the formula (2) occurs, and then potential (electro motive force based on OCV (Open Circuit Voltage)) occurs in each single cell. Then, the fuel cell stack 110 is electrically connected to an external circuit of a driving motor or the like, and current is taken out therefrom, and then the fuel cell stack 110 generates power.

$$2H_2 \rightarrow 4H^+ + 4e^- \tag{1}$$

$$O_2 + 4H^+ + 4e^- \rightarrow 2H_2O \tag{2}$$

<Anode>

The anode system includes the hydrogen tank 121, the normally closed type shutoff valve 122, an ejector 123, a normally closed type purge valve 124 and a normally closed type scavenging gas exhaust valve 125.

The hydrogen tank 121 is connected to an inlet of the anode flow passage 111 via the pipe 121a, the shutoff valve 122, the pipe 122a, the ejector 123 and the pipe 123a. When the shutoff valve 122 is opened in response to an instruction from the ECU 160 in order for the fuel cell stack 110 to generate power, hydrogen is supplied from the hydrogen tank 121 via the shutoff valve 122 to the anode flow passage 111.

The outlet of the anode flow passage 111 is connected to the intake port of the ejector 123 via the pipe 123b. After anode off-gas containing unconsumed hydrogen that is exhausted from the anode flow passage 111 is returned to the ejector 123, this anode off-gas is re-supplied for the anode flow passage 111, consequently circulating hydrogen. The pipe 123b is provided with a gas-liquid separator (not shown) that separates water in a liquid state accompanied with the anode off-gas.

The pipe 123b at the midstream portion thereof is connected to a diluter (described later) via the pipe 124a, the purge valve 124 and the pipe 124b. The purge valve 124 is periodically opened by control of the ECU 160 so as to discharge impurities (such as vapor and nitrogen) contained in the anode off-gas circulating in the pipe 123b at the time of power generation in the fuel cell stack 110.

The pipe 123b in the upper reach than the connection point to the pipe 124a is connected to the pipe 132c (described later) via the pipe 125a, the scavenging gas exhaust valve 125 and the pipe 125b. The scavenging gas exhaust valve 125 along with the scavenging gas introducing valve 141 (described later) are opened by control of the ECU 160 during the compressor 131 operation at the time of scavenging the fuel cell stack 110, more specifically, at the time of scavenging the anode flow passage 111.

In the present embodiment, the time of scavenging the fuel cell stack 110 denotes a time when temperature of the system detected by a temperature sensor (not shown) is less than a predetermined temperature (such as 0° C.) while the system is out of operation after power generation is stopped in fuel cell stack 110, and if it is determined that the inside of the fuel cell stack 110 will be frozen thereafter.

As described above, there are provided the shutoff valve 122 and the scavenging gas introducing valve 141 (described later) at the upper reach of the anode flow passage 111, and there are provided the purge valve 124 and the scavenging gas exhaust valve 125 at the lower reach of the anode flow passage 111. All the above valves are of normally closed type, and are normally maintained in the close state while power generation in fuel cell stack 110 is stopped (the system is out of operation), so that the anode flow passage 111 stays in the blocked state. Therefore, air outside a vehicle can be prevented from flowing through the scavenging gas exhaust valve 125 and the like into the anode flow passage 111.

<Cathode System>

The cathode system includes the compressor 131 (also referred to as the "oxidant gas supply member"), the first valve device 1 of normally open type, the second valve device 2 of normally open type, the back pressure valve of normally open type and the diluter 133.

The compressor 131 is connected to the outlet of the cathode flow passage 112 via the pipe 131a, the first valve device 1 and the pipe 131b. The compressor 131 starts operation in response to an instruction from the ECU 160, and takes in air containing oxygen via the pipe 131a, etc., and supplies this air for the cathode flow passage 112.

Specifically, the oxidant gas supply passage in which air (oxidant gas) flows in the cathode flow passage 112 (oxidant gas flow passage) includes the pipe 131a and the pipe 131b, and the first valve device 1 is provided in this oxidant gas supply passage. The first valve device 1 is a normally open type electromagnetic valve controlled by the ECU 160, and comes in the open state while power is being generated in the fuel cell stack 110 (the system is in operation), and comes in the close state after the power generation is stopped, that is, while the power generation is out of operation (the system is out of operation).

The structure of the first valve device 1 will be described in detail later on.

The outlet of the cathode flow passage 112 is connected to the diluter 133 via the pipe 132a, the second valve device 2, the pipe 132b, the back pressure valve 132 and the pipe 132c. Cathode off-gas (oxidant gas) discharged from the cathode flow passage 112 is exhausted via the pipe 132a, etc., to the diluter 133.

Specifically, the oxidant gas exhaust passage in which cathode off-gas exhausted from the cathode flow passage 112 (oxidant gas flow passage) flows includes the pipe 132a, the pipe 132b, the pipe 132c and the pipe 133a, and the second valve device 2 is provided in this oxidant gas exhaust passage. The second valve device 2 is a normally open type electromagnetic valve controlled by the ECU 160, and comes in the open state while power is being generated in the fuel cell stack 110 (the system is in operation), and comes in the close state after the power generation is stopped, that is, while the power generation is out of operation (the system is out of operation).

The structure of the second valve device 2 will be described later on.

The back pressure valve 132 is a normally open type valve including components such as a butterfly valve, etc., and its opening is controlled by the ECU 160 in accordance with the power generation demand such as an acceleration opening.

The diluter 133 is a container in which anode off-gas and cathode off-gas are mixed and hydrogen in the anode off-gas is diluted with the cathode off-gas (diluent gas), and includes a diluting space therein. The diluted gas is externally exhausted via the pipe 133a outside the vehicle.

A humidifier (not shown) is provided across the pipe 313b and the pipe 132a. The humidifier accommodates plural hollow fiber membranes having a moisture permeable property, through which moisture exchange is carried out between air flowing toward the cathode flow passage 112 and humid cathode off-gas exhausted from through the cathode flow passage 112 so as to humidify the air flowing toward the cathode flow passage 112.

<Scavenging Gas Introduction System>

The scavenging gas introduction system includes a scavenging gas introducing valve 141 of normally closed type. The upper reach of the scavenging gas introducing valve 141 is connected to the pipe 131a via the pipe 141a, the lower reach of the scavenging gas introducing valve 141 is connected to the pipe 123a via the pipe 141b. When scavenging the fuel cell stack 110 with the compressor 131 in operation, the ECU 160 opens the scavenge gas introducing valve 141 so as to introduce scavenge gas from the compressor 131 into the anode flow passage 111.

<IG>

The IG 151 is a start up switch of the fuel cell system 100 (fuel cell vehicle), and is provided in vicinity of a driving seat. The IG 151 is connected to the ECU 160 so that the ECU 160 detects on/off signals from the IG 151.

<ECU>

The ECU 160 (controller) is a controller that electronically controls the fuel cell system 100, and includes CPU, ROM, RAM, various interfaces, electronic circuits, etc., and controls various devices and executes various processes in accordance with programs stored therein.

The ECU 160 has functions to control the first motor 40 (described later) of the first valve device 1, the second motor 40A (described later) of the second valve device 2, and to control the open and close operations of the first valve 10 and the second valve 10A (described later).

The ECU 160 also has functions to control the first solenoid device 50 (described later) of the first valve device 1 and the second solenoid device 50 A (described later) of the second valve device 2, and to control the lock and unlock operations of the first solenoid device 50 and the second solenoid device 50A.

<First Valve Device, Second Valve Device>

The structure of the first valve device 1 and the second valve device 2 is specifically described with reference to FIGS. 2 to 4.

The first valve device 1 includes the normally open type first valve 10, the first motor 40 (first electric drive device, first operating member) that operates open and close of the first valve 10 with current supply, and the first solenoid device 50 (first close state maintaining member) that maintains the first valve 10 in the close state.

The second valve device 2 includes the normally open type second valve 10A, the second motor 40A (second electric drive device, second operating device) that operates open and close of the second valve 10A with current apply, and the second solenoid device 50A (second close state maintaining member) that maintains the second valve 10A in the close state.

Note that the first valve device 1 and the second valve device 2 have an identical structure to each other, which means that the first valve 10 and the second valve 10A, the first motor 40 and the second motor 40A, the first solenoid device 50 and the second solenoid device 50A have the identical structure to each other, respectively. Therefore, descriptions are provided only on the first valve device 1, and descriptions on the second valve device 2 is omitted hereinafter.

[First Valve]

The first valve 10 includes the body 11 (valve box) provided with the inlet port 12 and the outlet port 13, the valve body 20 detachably seated to the valve seat 14 provided around the inlet port 12, and the compressed coil springs 31, 32.

The valve body 20 includes the plate body 21 detachably seated to the valve seat 14 around the inlet port 12, the first rod 23 integral with the plate body 21 and extending upward from the center of the plate body 21, and the second rod 25 in whose inside at the lower end portion the first rod 23 slidably moves and whose top portion extends through the ceiling wall of the body 11 that extends externally. This means that the rod including the first and second rods 23, 25 is retractable.

Figure 2:
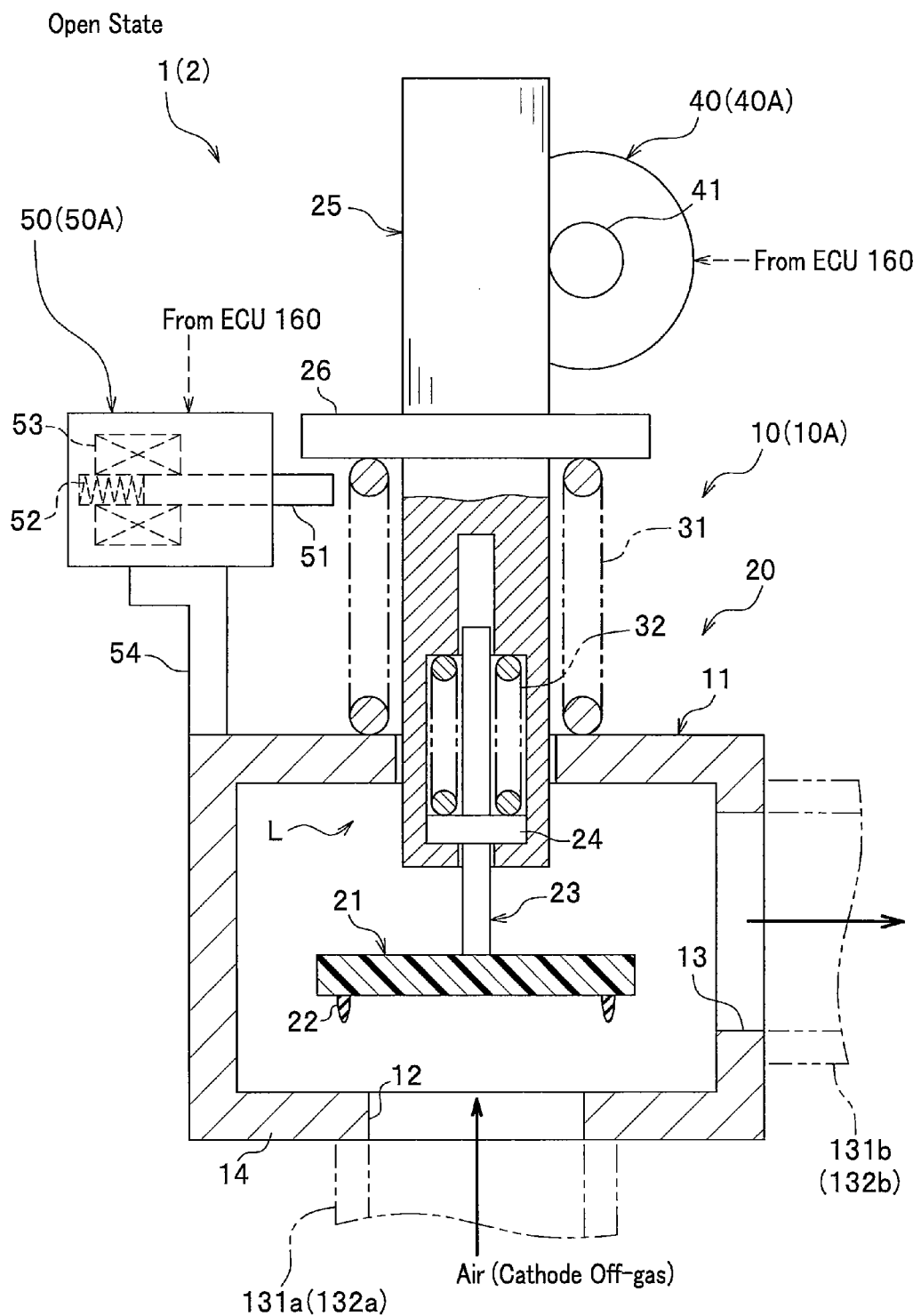
FIG. 2 is a sectional side view of a first valve device or second valve device of normally open type according the present embodiment, showing that the valve device is in an open state.

The plate body 21 of the valve body 20 has a disk shape, and the first valve 10 comes in the open state when the plate body 21 is unseated from the valve seat 14 so that the inlet port 12 comes in communication with the outlet port 13 (see FIG. 2, FIG. 4). On the other hand, the first valve 10 comes in the close state when the plate body 21 is seated to the valve seat 14, so that the inlet port 12 comes in communication with the outlet port 13 (see FIG. 3).

There is provided the annular seal member 22 of rubber material or the like on a side face of the valve seat 14 of the plate body 21. When the plate body 21 is seated (when the first valve 10 is closed), the seal member 22 elastically deforms thereby to enhance the sealing performance. The seal member 22 may be provided on the valve seat 14, instead.

There is formed the flange 24 at the middle portion of the first rod 23, and the compressed coil spring 32 is installed between the flange 24 and the second rod 25. The compressed coil spring 32 urges the plate body 21 integral with the flange 24 in the closing direction (downward) so as to apply the sealing force of the plate body 21 (valve body 20) in the close state (see FIG. 3).

Accordingly, even when the thickness of the seal member 22 becomes smaller by long-term use, the compressed coil spring 32 urges the plate body 21 in the closing direction so that the plate body 21 tightly contacts the valve seat 14 via the seal member 22, thereby to secure and maintain the tight close state therebetween.

In addition, even if the flange 26 (described later) and the latch shaft 51 (described later) of the first solenoid device 50 become worn out by long-term use and the lock position of the flange 26 varies, because the compressed coil spring 32 urges the plate body 21 in the closing direction, the plate body 21 is preferably seated to the valve seat 14, thereby to secure and maintain the first valve 10 to be in the close state.

Specifically, the lost motion mechanism L included in the first valve 10 (second valve 10A), which applies the sealing force in the close state, includes the plate body 21, the first rod 23 having the flange 24, the lower end portion of the second rod 25 and the compressed coil spring 32.

The upper portion of the second rod 25 externally extending through the ceiling wall of the body 11 is provided with a rack (not shown) meshed with the pinion 41 (described later) of the first motor 40 around the outer circumferential face of this upper portion of the second rod 25.

There is provided the flange 26 around the middle portion of the second rod 25, and the compressed coil spring 31 is installed between the flange 26 and the body 11. The compressed coil spring 31 urges the flange 26 (the second rod 25), the first rod 23 and the plate body 21 in the opening direction (upward), thereby to make the first valve 10 (the second valve 10A) be a normally open type valve.

The spring force of the compressed coil spring 31 is defined to be greater than the static torque of the first motor 40. Therefore, when the lock is released by the first solenoid device 60 when stopping current supply to the first motor 40, the compressed coil spring 31 moves the second rod 25 upward against the static torque of the first motor 40, accordingly the plate body 21 comes unseated from the valve seat 14 so that the first valve 10 opens.

Even when the second rod 25 moves upward, since the flange 24 of the first rod 23 is locked at the lower end of the second rod 25, the first rod 23 does not come off the second rod 25 (FIG. 2).

The inlet port 12 is connected to the pipe 131a in which air from the compressor 131 (air as the scavenging gas at the time of scavenging) flows, and the outlet port 13 is connected to the pipe 131b. Specifically, the first valve 10 is installed in such a manner that the plate body 21 (valve body 20) seated to the valve seat 14 is pushed in the opening direction (upward in FIG. 2, etc.) by the air pressure from the compressor 131 (at the upper reach).

In other words, in the close state of the first valve 10, if the pressure at the upper reach of the first valve 10 becomes equal to or greater than the predetermined pressure due to a certain reason, the plate body 21 (valve body 20) is pushed in the opening direction by the above pressure and comes unseated from the valve seat 14, so that the first valve 10 comes into the open state (see FIG. 4).

Specifically, the first valve 10 (second valve 10A) including the lost motion mechanism L has a relief function to release the pressure at the upper reach when, the pressure at the upper reach becomes equal to or greater than the predetermined pressure in the close state of the first valve 10, the first valve 10 opens and comes into the open state to release this pressure.

[First Motor]

The first motor 40 (second motor 40A) is the first electric drive device (second electric drive device) that drives the first valve 10 (second valve 10A) from the open state into the close state, and the first motor 40 includes a stepping motor, etc. When current is supplied for the first motor 40 in response to an instruction from the ECU 160, the first motor 40 rotates in the positive rotation direction or in the negative rotation direction.

The output shaft of the first motor 40 is provided with the pinion 41, which is meshed with the rack (not shown) of the second rod 25. When the first motor 40 rotates, the second rod 25 moves downward so that the plate body 21 is seated to the valve seat 14.

The first motor 40 (second motor 40A) starts rotating after the system is stopped (after the power generation in the fuel cell stack 110 is stopped) in order to drive the first valve 10 (the second valve 10A) from the open state into the close state, thereby to block the cathode flow passage 112 (see FIG. 1). The first motor 40 is fixed to the body 11 via a bracket (not shown), and is supplied with power from the battery (not shown) as a power source.

[First Solenoid Device]

Figure 3:
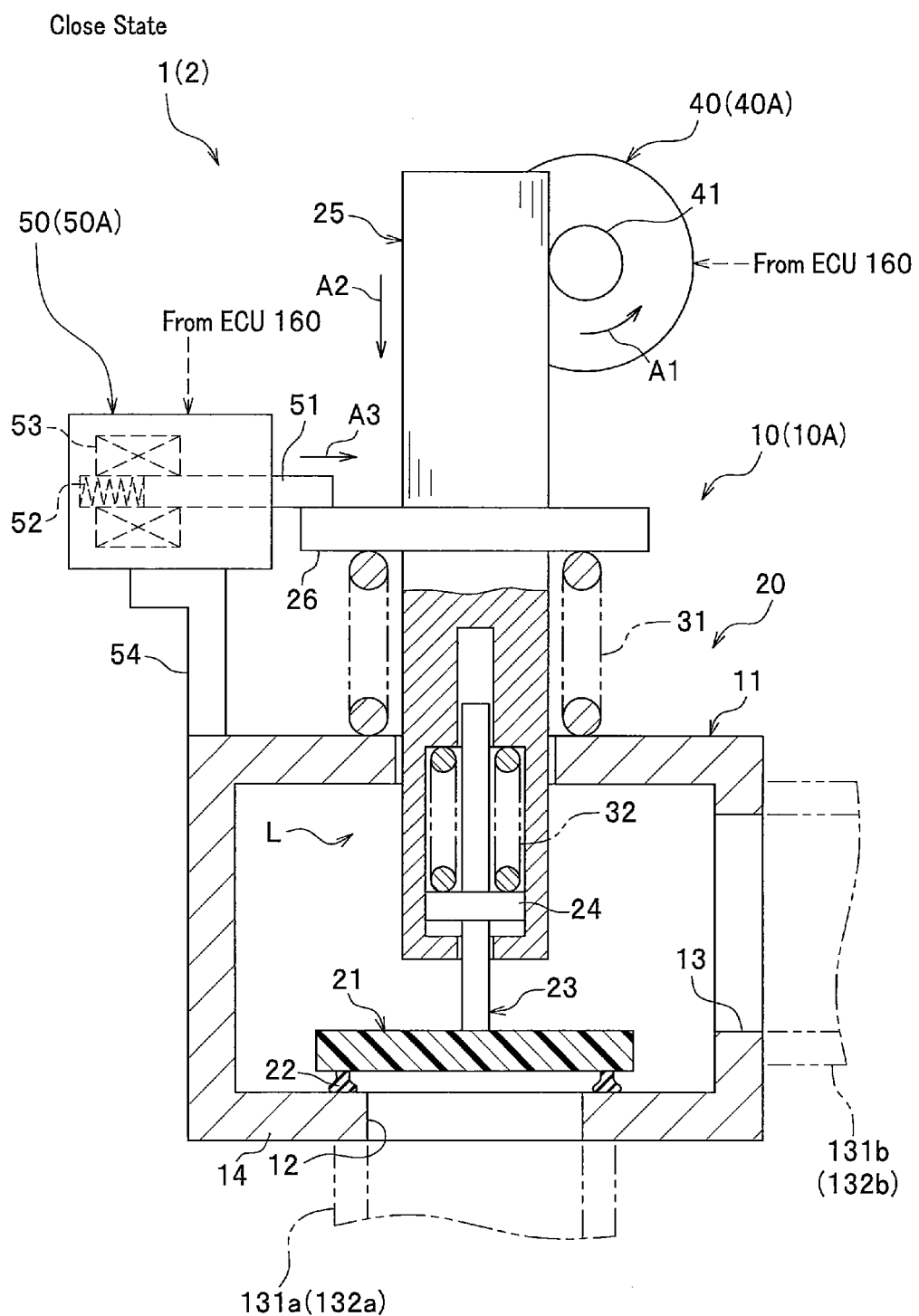
FIG. 3 is a sectional side view of a first valve device or second valve device of normally open type according the present embodiment, showing that the valve device is in a close state.

The first solenoid device 50 (second solenoid device 50A) is the first locking device (second locking device), which, after the first valve 10 comes in the close state by the first motor 40 after the system stop (after the power generation in the fuel cell stack 110 is stopped), latches the upper face of the flange 26 of the second rod 25, thereby to lock the second rod 25 in the up and down direction in order to hold the first valve 10 (second valve 10A) in the close state (see FIG. 3).

The first solenoid device 50 includes the latch shaft 51 that latches the flange 26 at the time of locking, the compressed coil spring 52 that urges the latch shaft 51 in the forward direction (projecting direction) toward the flange 26, and the solenoid 53 that retracts the latch shaft 51 with current supply in response to an instruction from the ECU 160.

Specifically, in the close state of the first valve 10, even though the latch shaft 51 is in the state of latching the flange 26 of the second rod 25 (in the lock state), the plate body 21 and the first rod 23 are still movable relative to the second rod 25, that is, the plate body 21 can be unseated from the seat valve 14, thereby to secure the function as a relief valve (described later) of the first valve 10.

Then, when current is supplied for the solenoid 53, a magnetic force is generated by a fixed core (not shown) in the vicinity of the solenoid 53, and this fixed core attracts a movable core (not shown) integral with the latch shaft 51, so that the latch shaft 51 moves inward. After the latch shaft 51 is retracted in the above manner, the latch shaft 51 does not latch the flange 26 any more, so that the second rod 25 (valve body 20) becomes movable in the up and down direction.

The first solenoid device 50 is fixed to the body 11 via the bracket 54, as similar to the first motor 40, and is supplied with power from the not shown battery as a power source.

<<Operational Effects of Fuel Cell System>>

Hereinafter, operational effects of the fuel cell system 100 are described.

<System In Operation (During Power Generation in Fuel Cell Stack)>

The fuel cell system 100 in operation (during the power generation in the fuel cell stack 110) is described hereinafter.

The ECU 160 controls the first valve device 1 (first valve 10) and the second valve device 2 (second valve 10A) to be in the open state so as to open the cathode flow passage 112, thereby to let air flow through the cathode flow passage 112.

Now, the first valve device 1 is specifically explained with reference to FIG. 2. The ECU 160 stops current supply for the first motor 40 and the first solenoid device 50, and unseats the valve body 20 from the valve seat 14 by the compressed coil spring 31, so that the first valve 10 of normally open type comes into the open state. Specifically, the first valve 10 of normally open type is held in the open state with consuming no energy such as electric power and the like. This is the same as in the second valve device 2 (second valve 10A).

<System Out of Operation (After Power Generation in Fuel Cell Stack is Stopped)>

Next, the fuel cell system 100 out of operation (when the power generation in the fuel cell stack 110 is stopped) is described hereinafter.

When a driver switches off the IG 151 in order to stop a fuel cell vehicle, the ECU 160 detects its off signal, and then stops the power generation in the fuel cell stack 110 so as to stop the fuel cell system 100.

Specifically, the ECU 160 controls an electric power controller (not shown) connected to an output terminal of the fuel cell stack 110 to stop taking out power from the fuel cell stack 110 so as to stop the power generation in the fuel cell stack 110. The ECU 160 closes the shutoff valve 122, stops hydrogen supply for the anode flow passage 111, and stops the compressor 131 to stop air supply for the cathode flow passage 112.

Thereafter, the ECU 160 closes the first valve 10 of the first valve device 1 and the second valve 10A of the second valve device 2.

The first valve device 1 is described more specifically with reference to FIGS. 2 and 3. The ECU 160 supplies current for the solenoid 53 of the first solenoid device 50 so as to retract the latch shaft 51 from the flange 26. Holding the latch shaft 51 retracted, the ECU 160 supplies current for the first motor 40 to rotate the pinion 41 (see the arrow A1) so as to lower the second rod 25 (valve body 20) (see the arrow A2).

To what extent the second rod 25 is to be lowered, that is, the rotational angle of the first motor 40 may be defined such that, with the first valve 10 in the close state, the seal member 22 is elastically deformed enough to exert its sealing effect, and the compressed coil spring 32 is moderately compressed so as to sufficiently urge the plate body 21 against the valve seat 14 even if the thickness of the seal member 22 becomes smaller by long-term use, so that the first valve 10 is securely and completely closed.

In such a manner, the plate body 21 of the valve body 20 is seated to the valve seat 14 to block the inlet port 12 and the outlet port 13, so that the first valve 10 comes into the close state.

After the first valve 10 comes in the close state, the ECU 160 stops current supply for the solenoid 53 of the first solenoid device 50. Then, the latch shaft 51 moves forward to the flange 26 by the compressed coil spring 52 (see the arrow A3) to latch the upper face of the flange 26 so that the first valve 10 is maintained in the close state, that is, is locked. After the first valve 10 is maintained in the close state, the ECU 160 stops current supply for the first motor 40.

In this way, while the power generation is out of operation (the system is out of operation) after the power generation in the fuel cell stack 110 is stopped (after the system is stopped), since the first valve 10 of the first valve device 1 and the second valve 10A of the second valve device 2 are kept to be in the close state and the cathode flow passage 112 is blocked, external fresh air never flows through the first valve 10 or the second valve 10A into the cathode flow passage 112.

Accordingly, rise in potential in the cathode or the anode constituting the MEA, or generation of OH radical and the like can be reduced, and deterioration of the cathode or the anode and decomposition of the electrolyte membrane can be suppressed. As a result, deterioration of the fuel cell stack 110 can be reduced thereby to increase duration thereof.

After the first motor 40 (second motor 40A) closes the first valve 10 (second valve 10A), the latch shaft 51 of the first solenoid device 50 (second solenoid device 50A) latches the flange 26, so that the first valve 10 (second valve 10A) can be maintained in the close state.

Then, after the latch shaft 51 latches the flange 26, and the first valve 10 (second valve 10A) is maintained in the close state, current supply for the first motor 40 (second motor 40A) is stopped, so that power consumption in the first motor 40 (second motor 40A) is stopped, so as to preserve the remaining amount of the battery (not shown) as a power source thereof.

In addition, while the first valve 10 (second valve 10A) is being maintained in the close state, current supply for the first solenoid device 50 (second solenoid device 50A) is stopped, so that power consumption in the first solenoid device 50 (second solenoid device 50A) can also be stopped.

The first valve 10 (second valve 10A) includes the lost motion mechanism L and the compressed coil spring 32 urges the plate body 21 against the valve seat 14. Therefore even if, for example, the thickness of the seal member 22 becomes smaller by long-term use, the plate body 21 can be securely seated to the valve seat 14. Accordingly, the first valve 10 (second valve 10A) can securely come in the close state, thereby to enhance its reliability.

While the system is kept stopped, in order to scavenge the cathode flow passage 112 of the fuel cell stack 110, the ECU 160 unlocks the first solenoid device 50 (second solenoid device 50A), and after the first valve 10 (second valve 10A) is opened, the ECU 160 activates the compressor 131 to scavenge the cathode flow passage 112 with scavenging gas from the compressor 131. Then, after the cathode flow passage 112 is scavenged, the ECU 160 closes the first valve 10 (second valve 10A).

<System Start Up (Start Up of Power Generation in Fuel Cell Stack)>

Hereinafter, descriptions are provided on the start up of the fuel cell system 100 (start up of power generation in the fuel cell stack 110).

When a driver switches on the IG 151, the ECU 160 detects its signal and then opens the first valve device 1 and the second valve device 2, in order to drive a fuel cell vehicle.

With reference to FIGS. 2 and 3, the first valve device 1 is specifically described. The ECU 160 supplies current for the solenoid 53 of the first solenoid device 50 to retract the latch shaft 51 from the flange 26 thereby to unlatch the second rod 25 (valve body 20). Then, the compressed coil spring 31 pushes the flange 26 and the valve body 20 upward against the static torque of the first motor 40.

As a result, the plate body 21 of the valve body 20 comes unseated from the valve seat 14, and then the first valve device 1 (first valve 10) comes in the open state (see FIG. 2). Then, the ECU 160 stops current supply for the solenoid 53 of the first solenoid device 50.

Thereafter, the ECU 160 opens the shutoff valve 122 to supply hydrogen for the anode flow passage 111, and drives the compressor 131 to supply air for the cathode flow passage 112. The ECU 160 starts up power generation in the fuel cell stack 110 in accordance with the power generation demand from the accelerator or the like.

<Failure in Close State of First Valve Device and Second Valve Device>

With reference to FIG. 4, descriptions are provided on a failure in the close state of the first and second valve devices 1 and 2, more specifically a case in which even though an open instruction is input from the ECU 160 to the first and second valve devices 1 and 2, these valve devices 1 and 2 are not in the open state but still in the close state.

Such a failure in the close state of the first and second valve devices 1 and 2 may be caused if, for example, the first solenoid device 50 or the second solenoid device 50A has a failure so that the second rod 25 cannot be unlocked, or the first motor 40 (second motor 40A) operates improperly so that the valve body 20 moves in the close direction, etc.

For example, at the time of the system start up or of scavenging of the cathode 112, since ECU 160 controls the first and second valve devices 1 and 2 to be opened and determines that the first and second valve devices 1 and 2 are opened, the ECU 160 activates the compressor 131 so that the air pressure at the upper reach of the first valve device 1 begins to increase. This increasing air pressure pushes the plate body 21 of the valve body 20 in the close state in the open state direction (upward).

When the air pressure at the upper reach of the first valve device 1 (first valve 10) becomes equal to or greater than the first predetermined pressure, the compressed coil spring 32 is compressed with the second rod 25 in the lock state, the plate body 21 comes unseated from the valve seat 14 (see the arrow A4), and then the first valve 10 comes into the open state. In other words, the first valve 10 having the lost motion mechanism L functions as a relief valve, and the pressure at the upper reach of the first valve 10 is released.

Therefore, damages and or failures in devices (such as the compressor 131 and an intercooler at the lower reach of the compressor 131, etc.) at the upper reach of the first valve 10 and the pipe 131a, etc. due to abnormal rise in pressure can be prevented.

Note that the first predetermined pressure for defining the first valve 10 to come in the open state may be found through a pretest or the like, and may be defined to be a pressure at which devices at the upper reach of the first valve 10 experience no damages and or no failures.

Similarly, if the second valve device 2 (second valve 10A) has a failure in the close state and the pressure at the upper reach thereof becomes equal to or greater than the second predetermined pressure, the second valve 10A is controlled to come in the open state and functions as the relief valve (see FIG. 4), so that the pressure at the upper reach thereof is released. Accordingly, due to abnormal rise in pressure, damages and failures of devices such as the fuel cell stack 110, the pipes 131b and 132a and the humidifier (not shown) installed across the pipes 131b and 132a can be prevented.

Note that the second predetermined pressure for defining the second valve 10A to be in the open state may be obtained through a pretest or the like, and may preferably be defined to be a pressure at which devices at the upper reach of the second valve 10A (such as the fuel cell stack 110, etc.) experience no damages and or no failures, and may preferably be defined to be equal to or smaller than the first predetermined pressure for defining the first valve 10 to be in the open state, as well.

As described above, the embodiment of the present invention has been explained, but the present invention is not limited to this, and may be modified as follows, without departing from the spirit of the present invention.

The above described embodiment exemplifies that the valve body 20 is controlled to be from the open state into the close state by the rotational force of the motor 40, and it may also be controlled to supply current for either solenoid to operate the valve body 20 to be in the close state, or alternatively a hydraulic motor may be used to operate the valve body 20 to be in the close state.

The above embodiment exemplifies that the solenoid 53 retracts the latch shaft 51, and alternatively a rack may be formed on the latch shaft 51 and the latch shaft 51 may be retracted by an electrical motor having a pinion meshed with this rack.

The above embodiment exemplifies that the latch shaft 51 latches the flange 26 of the second rod 25, and alternatively the latch shaft 51 may latch the upper face of the plate body 21 if the first and second valves 10 and 10A include no lost motion mechanism L.

The above embodiment exemplifies that the latch shaft 51 latches the upper face of the flange 26 of the second rod 25, but the above latching mechanism is not limited to this, for example, the latching mechanism may be embodied by inserting the latch shaft 51 into a latch hole provided in the second rod 25. Or, a cam or the like may be used to latch the second rod 25, instead.

The above embodiment exemplifies that the first valve device 1 includes the first solenoid device 50 and the second valve device 2 includes the second solenoid device 50A respectively, but only either of the first and second valve devices 1 and 2 may include a solenoid.

The above embodiment exemplifies that the first and second valves 10 and 10A include the lost motion mechanism L respectively, but only either the valves 10 and 10A may include the lost motion mechanism L.

The above embodiment exemplifies that the fuel cell system 100 is mounted in a fuel cell vehicle, but may also be a fuel cell system that is mounted in a two-wheeled motor vehicle, a railway train or a vessel. In addition, the present invention may be applicable to a stationary fuel cell system for household use, or to a fuel cell system for a hot water supply system.

According to the present invention, there can be provided a fuel cell system that blocks the oxidant gas flow passage, as well as reducing energy consumption such power consumption.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A fuel cell system comprising:
    a fuel cell including a fuel gas flow passage and an oxidant gas flow passage, and generating power with fuel gas supply for the fuel gas flow passage and oxidant gas supply for the oxidant gas flow passage, respectively;
    an oxidant gas supply passage in which oxidant gas flows toward the oxidant gas flow passage;
    an oxidant gas exhaust passage in which oxidant gas discharged from the oxidant gas flow passage flows;
    a first valve that is normally open and has a first valve body, provided in the oxidant gas supply passage;
    a second valve that is normally open and has a second valve body, provided in the oxidant gas exhaust passage;
    a first electric drive device for operating the first valve, and energized to drive the first valve that is opened to be closed;
    a second electric drive device for operating the second valve, and energized to drive the second valve that is opened to be closed; and
    a controller for controlling the first electric device and the second electric drive device,
    the first valve body including a first plate body; and a first rod which is formed integrally with the first plate body and has a first latched portion,
    the second valve body including a second plate body; and a second rod which is formed integrally with the second plate body and has a second latched portion,
    during power generation in the fuel cell, the controller controlling the first electric device to operate the first valve to be in an open state, and controlling the second electric device to operate the second valve to be in an open state, thereby to open the oxidant gas flow passage,
    after the power generation in the fuel cell is stopped, the controller controlling the first electric device to operate the first valve to be in a close state, and the controller controlling the second electric device to operate the second valve to be in a close state, thereby to close the oxidant gas flow passage, and
    the fuel cell system further comprising a first close state maintaining member; a second close state maintaining member; and a power source for the first electric device, the second electric device, a first solenoid and a second solenoid,
    the first close state maintaining member comprising a first latch shaft movable forward or backward in a radial direction of the first rod; a first latch-shaft urging-spring pressing against the first latch shaft in a forward direction; and the first solenoid to have the first latch shaft moved backward on being energized, the second close state maintaining member comprising a second latch shaft movable forward or backward in a radial direction of the second rod; a second latch-shaft urging-spring pressing against the second latch shaft in a forward direction; and the second solenoid to have the second latch shaft moved backward on being energized, after the power generation in the fuel cell is stopped; after the first valve is closed, the first latch shaft latching the first latched portion to maintain the first valve in a close state; after the second valve is closed, the second latch shaft latching the second latched portion to maintain the second valve in a close state; and after the first valve and second valve are maintained in a close state, the first electric device and the second electric device being stopped from being energized, the extendable and retractable first rod comprising a first A rod formed integrally with the first plate body; and a first B rod being movable relative to the first A rod and having the first latched portion, the extendable and retractable second rod comprising a second A rod formed integrally with the second plate body; and a second B rod being movable relative to the second A rod and having the second latched portion, the fuel cell system further comprising a first urging spring to press against the first A rod and the first B rod to extend while the first valve is open and to press against the first plate body to be kept closed while the first valve is closed, and the fuel cell system further comprising a second urging spring to press against the second A rod and the second B rod to extend while the second valve is open and to press against the second plate body to be kept closed while the second valve is closed.

* * * * *